Patented Apr. 16, 1940

2,196,985

UNITED STATES PATENT OFFICE 2,196,985

ALKYL HYDROXY AROMATIC SULPHONATES

Lawrence H. Flett, Hamburg, N. Y., assignor to National Aniline & Chemical Company, Inc., New York, N. Y., a corporation of New York No Drawing. Application July 31, 1934, Serial No. 737,777. Renewed February 21, 1939

20 Claims. (Cl. 260—512)

This invention relates to alkyl hydroxy aromatic sulphonates.

In my copending applications Serial Nos. 691,081 and 691,082, filed September 26, 1933, of which the present application is a continuation-in-part, I have described compounds of the type AHRS; A representing an aromatic nucleus which may contain substituents, H representing a nuclear hydroxyl group, R representing a nuclear alkyl group containing a relatively large number of carbon atoms, and S representing a nuclear sulphonic acid group which may be in the form of the free acid or a salt thereof. (The term "nuclear," as employed herein with reference to a radical, means that the radical is linked directly to a carbon atom of the aromatic nucleus represented by A.) The present invention provides improvements in said compounds and processes of making them.

According to the present invention, products of the said type AHRS having improved properties are obtainable by processes comprising halogenation of petroleum distillates, condensation of the resulting halogenated products or selected fractions thereof with nuclear hydroxy aromatic compounds, followed by a rearrangement treatment, if necessary, then sulphonation of the resulting products or selected fractions thereof, and conversion of the sulphonated products to their corresponding salts.

Thus, I have found, by chlorinating a petroleum distillate such as kerosene, liquid petrolatum, and the like, condensing the chlorination product with a nuclear hydroxy aromatic compound, and sulphonating the resulting condensation product, compositions are obtained which, in the form of the free sulphonic acids or their salts (especially the latter), are useful for detergent, cleansing, wetting and other purposes. For example, the said sulphonation products may be used in powder or in paste form, or in solution, as wetting, dispersing or emulsifying agents instead of the usual soaps, and/or for scouring, cleaning, washing, toilet and other purposes for which ordinary soaps have heretofore been employed, with or without the presence of, or admixture with, abrasive material, e. g., whiting, pumice, etc. They also may be employed in conjunction, or in admixture, with an ordinary soap (a higher fatty acid salt); since it has been found, according to the present invention, that the sulphonation products of the present invention, when present jointly with an ordinary soap, serve to increase the detergency of the soap (whereby either a lesser amount of soap may be employed or, with the same amount of soap, a better and quicker cleansing effect may be secured), and they prevent or hinder formation of objectionable precipitates which are otherwise produced by the soap when used in hard water or in acid or salt baths. The sulphonation products of the present invention have the further advantage of being, in general, better wetting agents, of being more readily soluble in water and various organic solvents than the usual soaps, and of leaving goods washed therewith with a soft feel. Inasmuch as water solutions of said sulphonation products in the form of their alkali metal salts are neutral in reaction, they may be safely used for the washing of delicate silks and other fine fabrics, as well as for personal toilet purposes. In addition to their usefulness as detergents, the mixed sulphonated aromatic compounds of the type AHRS herein disclosed may be employed, either in the form of the free acids or their salts, as wetting, impregnating, dispersing, assisting, tanning, penetrating, insecticidal and fungicidal agents.

As is well known in the art, petroleum distillates are mainly mixtures of aliphatic hydrocarbons, including both saturated acyclic aliphatic hydrocarbons containing straight or branched carbon chains and cyclic aliphatic hydrocarbons as well as various amounts of unsaturated aliphatic hydrocarbons in the acyclic and cyclic forms, depending upon the source of the petroleum and the method of distillation and/or purification. When the petroleum distillates are halogenated in the preparation of the products of the present invention, mixtures of various halogenated derivatives of the said aliphatic hydrocarbons are produced (which are generically referred to herein as "alkyl halides"), and the said mixtures of alkyl halides, when condensed with the hydroxy aromatic compounds, produce mixtures of alkyl hydroxy aromatic compounds of the type AHR, in which the alkyl groups represented by R correspond with aliphatic hydrocarbons of the petroleum distillate from which they were produced. Accordingly, when the mixtures of alkyl hydroxy aromatic compounds are sulphonated, compositions are produced which contain mixtures of sulphonated alkyl hydroxy aromatic compounds of the type AHRS. The present invention thus makes possible the direct obtainment of the benefits of mixed components in a relatively simple manner.

The present invention has the additional advantage that it provides a relatively simple and direct method of producing products having valuable detergent and other properties from raw material which is readily available in large quantities; thereby making feasible the economical production of such products on a commercial scale.

In general, mixtures of sulphonated products of the said type AHRS which are obtained from petroleum distillates boiling at temperatures falling within the range 80° C. at atmospheric pressure and 380° C. at 50 mm. pressure (and which in general contain not less than 7, and not more than 35, carbon atoms in the alkyl groups represented by R), possess such wetting and/or emulsifying action as to render them useful as surface active agents. While all of the said mixed alkyl hydroxy aromatic sulphonic acids of the present invention have detersive properties, those in which the alkyl groups represented by R contain predominantly 7 to 11 carbon atoms have high wetting power and are especially valuable for use as wetting agents and as assistants to emulsifying and/or dispersing and/or cleansing agents, and those in which the alkyl groups represented by R contain predominantly 12 to 35, more particularly 12 to 23, or still better 14 to 19, carbon atoms are especially valuable as cleansing and/or dispersing agents. The sulphonated products which are obtained from petroleum distillates having boiling points within the range of about 215° C. at atmospheric pressure to about 260° C. at 50 mm. pressure (and which it is believed contains about 12 to about 23 carbon atoms in the alkyl groups represented by R), and especially those derived from petroleum distillates having boiling points within the range about 235° C. at atmospheric pressure to about 215° C. at 50 mm. pressure (and which it is believed contain for the most part 14 to about 19 carbon atoms in the alkyl groups represented by R), are of particular interest in view of their advantageous detersive properties. Preferably the petroleum distillates subjected to halogenation in the preparation of the sulphonated products of the present invention should comprise as the predominant fraction thereof material boiling within the above noted preferred range of about 235° C. at atmospheric pressure to about 215° C. at 50 mm. pressure.

The aromatic nucleus represented by A in the foregoing formula may be derived from a carbocyclic or a heterocyclic, mononuclear or polynuclear, aromatic compound. It may be free from further substituents or it may contain one or more additional atoms or groups attached to the carbon or other atoms of the nucleus, the following substituents being cited as examples: one or more additional hydroxyl radicals besides that represented by H in the foregoing formula; one or more additional alkyl groups of the type represented by R in the foregoing formula, which may be the same or different; one or more additional sulphonic acid radicals (either in the acid or salt form) in addition to that represented by S in the foregoing formula; and one or more of the atoms or radicals Cl, Br, I, F, NO$_2$, NH$_2$, COOH, CONH$_2$, NHR$_a$, NR$_a$R$_b$, COOR$_a$, COR$_a$, CONHR$_a$, OR$_a$, SR$_a$, SO$_3$R$_a$ and R$_a$ (in which R$_a$ and R$_b$ represent any alkyl, aryl, hydroaryl, alkaryl, aralkyl, cycloalkyl, or heterocyclic radical, which groups or radicals may be further substituted or not and, if more than one is present, may be the same or different). Those products are of particular importance in which the said aromatic nucleus represented by A is a hydrocarbon nucleus of the benzene and naphthalene series which is free from further substituents.

The group represented by S in the foregoing formula may be in the form of the free sulphonic acid or in the form of a salt; for example, a salt resulting either from the replacement of the hydrogen of said sulphonic acid group with its equivalent of a metal (preferably an alkali metal) or from the addition of ammonia or an organic base.

In preparing the sulphonated products, in accordance with one preferred method of procedure, a hydrocarbon distillate of the character described above is chlorinated or otherwise halogenated in accordance with known processes for the production of chlorinated or other halogenated derivatives of aliphatic hydrocarbons, whereby mixtures comprising chlorinated or other halogenated hydrocarbon derivatives are produced; a hydroxy aromatic compound of the said type AH is then converted to a mixture of alkyl hydroxy aromatic compounds of the said type AHR by a process including reaction of the hydroxy aromatic compound with the chlorinated or other halogenated hydrocarbon derivatives, or with a selected portion thereof; and the resulting mixture of alkyl hydroxy aromatic compounds, or a selected portion thereof, is then sulphonated. The resulting mixture of sulphonic acids is preferably converted into a mixture of their corresponding salts. If inorganic salts are simultaneously formed, they may be left in the mixture of said sulphonic acid salts, or they may be separated therefrom, as the use of the product may determine.

The invention will be illustrated by the following specific examples. It will be realized by those skilled in the art that the invention is not limited thereto, except as indicated in the appended patent claims. The parts are by weight, the temperatures are in degrees centigrade, and the pressure is atmospheric pressure unless otherwise indicated.

PRODUCTION OF ALKYLATED HYDROXY AROMATIC COMPOUNDS

*Example 1—Alkyl phenol mixture*

Part 1.—Chlorine is passed into 328 parts of a kerosene (a Pennsylvania petroleum distillate) which boils from 235° to 240°, and which is believed to have an average composition corresponding with the empirical formula $C_{14}H_{30}$, while maintaining the temperature at 50°. To facilitate the reaction, the reaction mixture, which is contained in a glass reaction vessel, is subjected to direct sunlight during the treatment with chlorine and is well agitated. When the weight of the reaction mixture has increased about 58 parts, which requires about 3 hours, the introduction of chlorine is discontinued, and the agitation is continued for about an additional fifteen minutes. (The increase in weight of about 58 parts corresponds substantially with the theoretical increase in weight for the formation of the monochloride.) The reaction mixture is subjected to fractional distillation and there are obtained the following fractions:

(1) 100 parts of material boiling below 165° at 34 mm. (mainly unchlorinated hydrocarbons);
(2) 189 parts of a product boiling from 165° to 175° at 34 mm. (mainly monochlorinated hydrocarbons);
(3) 95 parts of a product boiling above 175° at 34 mm. pressure (mainly polychlorinated hydrocarbons).

Part 2.—150 parts of the chlorinated hydrocarbon product obtained as fraction (2) in Part 1 of this example, 150 parts of phenol and 130 parts of anhydrous zinc chloride are agitated while being heated at 170° in a vessel provided with a reflux condenser. After about five hours the heating is discontinued, the mixture is allowed to cool, is washed with dilute hydrochloric acid (100 parts of 10 per cent. HCl), and is then distilled at 4 mm. pressure. A first fraction boiling up to 140° (comprising unreacted phenol, hydrocarbon, etc.) is separated and then the portion of the product boiling from 140° to 250° at 4 mm. pressure is separately collected, about three-fourths of which boils between 175° and 220°. The product, which is an oil showing fluorescence under ultra-violet light, insoluble in water, soluble in alcohol, gasoline, and other organic colvents, is comprised mainly of a mixture of alkyl phenols which may be represented by the general formula:

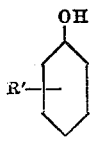

in which R' is a primary, secondary or tertiary alkyl group which for the most part is probably in the para-position to the hydroxyl group, the average number of carbon atoms in the groups represented by R' probably being about 14.

Example 2

Chlorine is passed into 400 parts of a kerosene boiling from about 195° to about 300° (and boiling for the most part from about 225° to 275°), having a specific gravity of 0.799 at 24°, containing about 5.6 per cent. of unsaturated hydrocarbons, and having a probable carbon content ranging from 11 to 18 carbon atoms and a probable average content of about 13.4 carbon atoms, at 50° in diffused light until there is an increase of weight of 111 parts, 2 parts of which is due to dissolved hydrogen chloride. The resulting product comprises unchlorinated hydrocarbon in admixture with mono-, di-, and polychlorinated hydrocarbons, the average chlorine content of the mixture being equivalent to about one and one-half atoms of chlorine per molecule of hydrocarbon having the stated carbon content. 150 parts of this chlorinated mixture is slowly added to an agitated mixture of 200 parts phenol and 5 parts anhydrous zinc chloride at 75°, and the temperature is maintained at 75° for about 30 minutes after all the chlorinated mixture has been added. The temperature of the mixture is then raised and maintained at 135° for 2.5 hours. 5 parts of zinc dust is then added, and after one hour another 5 parts of zinc dust is added, the temperature being maintained during this addition and for about 3 hours afterward at 135°. The reaction mixture is cooled, treated with water, and the oil is separated from the water and residual zinc dust and fractionally distilled. The fraction boiling from 140° to 250° at 4 mm. pressure is separately collected. It comprises a mixture of saturated and unsaturated alkyl phenols and chloralkyl phenols, the alkyl groups containing a probable average content of about 13 carbon atoms.

Example 3

Part 1.—A crude chlorinated kerosene is prepared by chlorinating at 50°, in a lead-lined vessel, a kerosene of the type employed in Example 2, until the reaction mixture reaches a specific gravity of 0.91. 150 parts of this product is reacted with 200 parts of phenol as described in Example 2.

Part 2.—The crude product of Part 1 of this example is washed with water and distilled in vacuo. The fraction distilling from 140° to 240° at 3 mm. pressure is separately collected. It comprises a mixture of alkyl phenols in which the alkyl groups have a probable average content of 13 carbon atoms. The alkyl groups are probably for the main part saturated alkyl hydrocarbon groups.

Example 4

Chlorine is passed into 300 parts of a purified petroleum oil distillate known commercially as "white oil" which boils from 210° to 285° at 25 mm. pressure and has a probable average composition corresponding with the empirical formula $C_{23}H_{48}$, the procedure and reaction conditions being the same as those in Example 1, Part 1. The introduction of chlorine is discontinued when the reaction mixture has increased in weight about 33 parts, about 1.5 hours being required, and the agitation is continued thereafter for about fifteen minutes. (The increase in weight of about 33 parts corresponds substantially with the theoretical increase in weight for the formation of the monochloride.) 200 parts of the resulting chlorinated white oil, 200 parts of phenol and 35 parts of anhydrous zinc chloride are heated and refluxed at 170° for about 5 hours in the manner described in Example 1, Part 2. The oily product is decanted from the zinc chloride and is fractionally distilled in vacuo. The distillate boiling from 240° to 300° at 3 mm. pressure is separately collected. It comprises a mixture of alkyl phenols in which the alkyl groups have a probable average content of about 23 carbon atoms.

Example 5

Chlorine is passed into 600 parts of a commercial petroleum distillate boiling from 240° to 364° and assumed to have an average composition represented by the empirical formula $C_{17.3}H_{36.6}$, the procedure and reaction conditions being the same as those in Example 1, Part 1. When an increase in weight of about 88 parts takes place, which usually requires about 3 hours and which corresponds substantially with the theoretical increase in weight for the formation of the monochloride, the introduction of chlorine is discontinued but the agitation is continued for an additional fifteen minutes. 200 parts of the resulting chlorinated kerosene, 125 parts of phenol and 35 parts of anhydrous zinc chloride are refluxed for 5 hours. The oily product is decanted from the zinc chloride and is fractionally distilled in vacuo. The distillate boiling from 190° to 275° at 4 mm. pressure is separately collected. It is comprised chiefly of a mixture of alkyl phenols wherein the average number of carbon atoms in the alkyl groups is probably about 17.

Example 6

20 parts of 75 per cent sulphuric acid are added slowly to a well stirred mixture of 125 parts of phenol and 200 parts of the crude, undistilled chlorinated hydrocarbon product of Example 3, Part 1. Some reaction takes place and the reaction mass is heated to a temperature of about 85°. 20 parts of 100 per cent. sulphuric acid are then added and the mixture is heated for three hours at 130° to 135°. The reaction mixture is cooled and washed twice with an aqueous solution of sodium chloride (20 parts of sodium chloride in 200 parts of water), and the insoluble oil is separated and fractionally distilled in vacuo. The fraction boiling from 160° to 250° at 4 mm. pressure is separately collected. It is similar to the product resulting from the process of Example 3.

Example 7

200 parts of the crude, undistilled chlorinated hydrocarbon product of Example 3, Part 1, 125 parts of phenol and 25 parts of zinc dust are heated under refluxing and agitation at 170° for about 4 hours. The oily product is decanted from the zinc residues and fractionally distilled in vacuo. The portion of the distillate boiling from 160° to 250° at 4 mm. pressure is separately collected. It is similar to the product resulting from the process of Example 3.

Example 8

150 parts of the chlorinated hydrocarbon product prepared in Example 3, Part 1, 150 parts of phenol, 130 parts of anhydrous zinc chloride and 10 parts of tetrachlorethane are heated under refluxing and agitation at 140° to 150° for about 3½ hours, an additional 10 parts of tetrachlorethane being added after the reaction has proceeded for about 2 hours. The oily reaction mixture is decanted from the zinc chloride, washed with 10 per cent. hydrochloric acid and fractionally distilled in vacuo. The portion of the distillate boiling from 180° to 240° at 10 mm. pressure is separately collected. It is similar to the product resulting from the process of Example 3.

Example 9—Alkyl cresylic acid

Chlorine is passed into 300 parts of kerosene (boiling from about 210° to about 255°, and for the most part from about 220° to 240°) at 5° to 15° until there is a gain in weight of 58 parts, exclusive of the small amount of dissolved hydrogen chloride present. 150 parts of the resulting chlorinated kerosene, 70 parts of commercial cresylic acid and 25 parts of anhydrous zinc chloride are agitated vigorously and heated at 135° for 45 minutes. After cooling, the liquid is decanted from the solid material and washed with about 100 parts of 10 per cent. hydrochloric acid. The washed oil is vacuum distilled, and the fraction of the distillate boiling between 190° and 240° at 8 mm. pressure is separately collected. It is an amber to white liquid and is comprised chiefly of a mixture of alkyl cresols corresponding with the general formula:

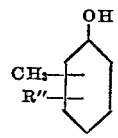

in which R″ is a primary, secondary or tertiary alkyl group and in which the alkyl groups represented by R″ have a probable average content of 12 to 15 carbon atoms.

Example 10—Alkyl p-cresol 100 parts of the chlorinated hydrocarbon product prepared in Example 2, 100 parts of p-cresol and 80 parts of anhydrous zinc chloride are heated under refluxing and agitation, as described in Example 1, part 2, for about 4 hours. The oily product is decanted from the zinc chloride, washed with dilute hydrochloric acid and fractionally distilled in vacuo. The portion of the distillate boiling from 190° to 210° at 7 mm. pressure is separately collected. It comprises mainly a mixture of alkyl p-cresols which may be represented by the general formula:

in which R‴ is a primary, secondary or tertiary alkyl group, probably mostly in ortho-position to the hydroxyl group, the average number of carbon atoms in the alkyl groups represented by R‴ probably being about 13.

Example 11—Alkyl m-cresol 100 parts of m-cresol are employed instead of the p-cresol of Example 10. The portion of the resulting product boiling from 185° to 205° at 6 mm. pressure is separately collected. It comprises mainly a mixture of alkyl m-cresols which may be represented by the general formula:

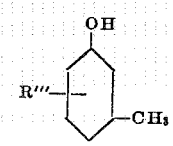

in which R‴ is a primary, secondary or tertiary alkyl group, the said alkyl groups having a probable average content of about 13 carbon atoms.

Example 12—Alkyl o-cresol 150 parts of the crude, undistilled chloride of Example 1, part 1, 20 parts of anhydrous zinc chloride and 100 parts of o-cresol are heated to 135° for 10 hours, the resulting oil decanted off and distilled. The portion of the resulting product boiling from 160° to 250° at 4 mm. pressure is separately collected. It comprises mainly a mixture of alkyl o-cresols which may be represented by the general formula:

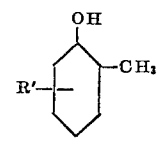

in which R′ is a primary, secondary or tertiary alkyl group, the said alkyl groups having a probable average content of about 14 carbon atoms.

Example 13—Alkyl o-chlorophenol

Chlorine is passed into 300 parts of kerosene, (boiling from about 210° to about 255°, and for the most part from about 220° to 240°) at 5° to 15° until there is a gain in weight of 58 parts exclusive of the dissolved hydrogen chloride. 150 parts of the chlorinated kerosene, 80 parts of o-chlorophenol and 40 parts of anhydrous zinc chloride are agitated vigorously and heated at 135° for 45 minutes. The liquid is decanted from the solid and washed once with about 100 parts of 10 per cent. hydrochloric acid. The oil is vacuum distilled. The fraction boiling between 180° and 250° at 8 mm. pressure is collected separately. It is a brown to white liquid comprised chiefly of a mixture of alkyl o-chlorophenols corresponding with the general formula:

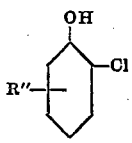

in which R'' has the meaning above given in Example 9.

Example 14—Alkyl salicylic acid

Chlorine is passed into 300 parts of kerosene (boiling from about 210° to about 255°, and for the most part from about 220° to 240°) at 5° to 15° until there is a gain in weight of 58 parts exclusive of the dissolved hydrogen chloride. 150 parts of the chlorinated kerosene, 90 parts of salicylic acid and 50 parts of anhydrous zinc chloride are agitated vigorously and heated at 140° to 150° for 4 hours. When the reaction mixture cools to 80°, 100 parts of water are added, and then about 70 parts of ether. The zinc chloride is removed by washing several times with acidulated water. The ether solution is extracted with sodium carbonate solution. The sodium carbonate solution is boiled to remove any dissolved ether, acidified with hydrochloric acid and heated. The excess salicylic acid dissolves and leaves the alkyl salicylic acid as an oil. The crude alkylated salicylic acid when cold is a brown, gummy solid. It forms a good detergent with alkali.

Example 15

800 parts of the chlorinated hydrocarbon product employed in Example 1, Part 2, 400 parts of crude pyrogallol and 50 parts of zinc chloride are agitated and heated in a container at 160° for 17 hours. The oily product is decanted from the hard residue which has formed and distilled in vacuo. The portion of the distillate boiling from 220° to 260° at 3 mm. pressure is separately collected. It comprises mainly a mixture of alkyl pyrogallols which may be represented by the following general formula:

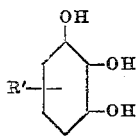

in which R' is a primary, secondary or tertiary alkyl group, the said alkyl groups having an average content of probably about 14 carbon atoms.

Example 16

A crude chlorinated kerosene is prepared as described in Example 1, Part 1, from a kerosene which boils from about 195° to 300°. It is fractionally distilled and the fraction boiling from 120° to 160° at 3 mm. pressure is separately collected. 200 parts of this fraction are mixed with 150 parts of 8-hydroxyquinoline, and to this mixture, with agitation, there are slowly and cautiously added 150 parts of anhydrous aluminum chloride. 50 parts of tetrachlorethane are added, and the mixture carefully heated. A vigorous reaction develops which is controlled, if necessary, by cooling same. After the reaction has moderated, the reaction mass is maintained at a temperature of 90° for 3 hours, the mixture poured on to ice, acidified with hydrochloric acid, and the oil which separates is washed with dilute caustic soda solution and distilled. The fraction which distills over at 200° to 230° at 3 mm. pressure is separately collected. The product thus obtained comprises an alkylated hydroxyquinoline having the following general formula:

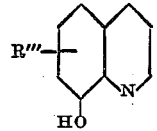

wherein R''' is a primary, secondary or tertiary alkyl group which probably contains an average of 13 to 15 carbon atoms.

Example 17

A mixture of 300 parts of the chlorinated hydrocarbon prepared in Example 3, Part 1, 200 parts para-hydroxydiphenyl and 35 parts of anhydrous zinc chloride is heated under a reflux condenser to refluxing temperature, with agitation, for 7 hours. The mixture is cooled, a sufficient amount of ether and alcohol (equal parts) is added to dissolve the solid organic material which is present, and the alcoholic-ether solution is washed with water and distilled in vacuo. The portion boiling from 230° to 300° at 5 mm. pressure is separately collected. It is comprised of a mixture of alkyl p-hydroxydiphenyls in which the average content of the alkyl group is probably about 13 carbon atoms.

Example 18

Chlorine is passed into 300 parts of kerosene (a South Texas petroleum distillate) boiling from 185° to 281°, having a specific gravity of 0.823 at 24°, an average composition probably corresponding to $C_{12.5}H_{27}$, and containing 1 per cent of unsaturated hydrocarbon. The kerosene, which is contained in a glass vessel, is maintained at a temperature of about 25° to 40° and subjected to diffused daylight for 2 hours, and then is maintained for an hour at 50° while subjected to actinic light from a mercury lamp, or until the reaction mixture has increased about 59 parts in weight (which corresponds approximately to monochlorination). A mixture of 300 parts of this chlorinated kerosene, 150 parts of phenol and 25 parts of anhydrous zinc chloride is heated, with agitation, to 135° for 10 hours; the reaction-mixture is cooled and then washed with water, and the oily residue is distilled in vacuo. The fraction distilling from 150° to 250° at 4 mm. pressure is separately collected. It comprises an alkyl phenol mixture in which the alkyl groups have a probable average content of about 12 to 13 carbon atoms.

Example 19

Chlorine is passed into 167 parts of a hydrocarbon mixture which boils from 130° to 140° at 18 mm. pressure, which contains about 68 per cent of unsaturated hydrocarbons, and which has a probable average content of 14 to 15 carbon atoms, while maintaining the temperature at 0° to 5°, until the reaction-mixture increases about 40 parts in weight (which increase in weight corresponds to dichlorination of an olefine having 14 to 15 carbon atoms). At this point, the proportion of unsaturated hydrocarbon has been reduced to 2.5 per cent. The reaction-mixture is distilled in vacuo, and the portion distilling between 150° and 180° at 12 mm. pressure is separately collected. The distillate thus obtained is a light colored oil, and corresponds in composition to a dichloride of a hydrocarbon having an average content of about 14 to 15 carbon atoms. A mixture of 91 parts of this distillate, 90 parts of phenol and 10 parts of anhydrous zinc chloride is heated at 135° for 5 hours, the reaction mass is washed with water, and the remaining oil is subjected to fractional distillation. The fraction boiling between 160° and 250° at 5 mm. pressure is separately collected. It comprises a mixture of chloralkyl phenols (alkyl phenols having chlorine as a substituent in the alkyl groups) wherein the alkyl groups have a probable average content of about 14 to 15 carbon atoms.

Example 20

A mixture of 200 parts of the chlorinated hydrocarbon product prepared in Example 3, Part 1, 150 parts beta-naphthol, and 100 parts of anhydrous zinc chloride is stirred and heated to 180° for 5 hours. The reaction mass is cooled, extracted with ether, and the ether extract is washed with water and then distilled under reduced pressure. The product boiling from 145° to 280° at 3 mm. pressure is separately collected. It comprises a mixture of alkyl beta-naphthols in which the alkyl groups have a probable average content of about 13 carbon atoms.

Example 21

420 parts of bromine dissolved in 1600 parts of carbon tetrachloride are slowly added in small portions at a time to 500 parts of kerosene of the type employed in Example 2 contained in a glass vessel, at ordinary temperature in the presence of actinic light from a mercury lamp. The resulting crude product, after distilling off the carbon tetrachloride, comprises a mixture of brominated hydrocarbons. 108 parts of this crude product is mixed with 75 parts of phenol and 10 parts of anhydrous zinc chloride, and the mixture is heated at 135° for 4 hours. The resulting mass is cooled, washed with water, and distilled under reduced pressure. The fraction distilling between 140° and 205° at 4 mm. pressure is separately collected. It comprises a mixture of alkyl phenols in which the alkyl groups have a probable average content of about 13 carbon atoms.

PRODUCTION OF SULPHONATED ALKYLATED HYDROXY AROMATIC COMPOUNDS

Example 22—Sulphonated alkyl phenol mixture

To 25 parts of the alkyl phenol mixture obtained in accordance with the procedure described in Example 1, Part 2, there is slowly added with good agitation 31 parts of 100 per cent sulphuric acid. The acid is added at such a rate that the final temperature of the mixture, as the result of the heat of reaction, is about 60°. After all of the sulphuric acid has been added, the mixture is warmed to 80° and held there for about 15 to 20 minutes to complete the sulphonation. The reaction mass is then drowned in 200 parts of water, and caustic soda is added until the resulting solution is slightly alkaline to Brom Cresol Green paper. The faintly alkaline mass is evaporated to dryness, or it is converted to a dry product in any other suitable manner. The resulting product comprises a mixture of the sodium salts of sulphonated alkyl phenols, in which the alkyl groups have an average content of about 14 carbon atoms, mixed with the sodium sulphate resulting from neutralization of the residual sulphuric acid, and other impurities. It is a powdery mass of the nature of a soap powder, and is readily soluble in water, also in neutral, acid and weakly alkaline aqueous solutions.

Example 23

The crude oil obtained in Example 3 is fractionally distilled in vacuo and the distillate boiling from 175° to 225° at 4 mm. pressure is separately collected. To 25 parts of this distillate, under agitation and maintained at a temperature of 30°, there is slowly added 11.6 parts of chlorsulphonic acid. The mixture is agitated for 15 minutes after all of the chlorsulphonic acid has been added. The temperature of the mixture is then raised and held at 70° for 15 minutes. The mixture is then drowned in 250 parts of water, the solution is made neutral to Brilliant Yellow and Congo Red papers by addition of caustic soda thereto, and evaporated to dryness on a double drum drier. The resulting product comprises the sodium salts of a mixture of alkyl phenol sulphonic acids in which the alkyl groups contain probably 11 to 18 carbon atoms. It is a light colored to white powder substantially free (less than 4 per cent.) of inorganic salts.

Example 24

10 parts of the alkyl phenol mixture obtained in Example 3 are stirred, and thereto 10 parts of sulphuric acid monohydrate (100% sulphuric acid) are added slowly so that the temperature of the reaction mixture does not exceed about 30° to 35°. The sulphonation mixture is then warmed to 40° and held at that temperature until a sample is completely soluble in neutral, acid and alkaline water, and/or does not precipitate calcium salts from a calcium chloride solution containing the equivalent of 0.224 gram calcium oxide per liter (30 to 90 minutes). The solution is sometimes slightly turbid due to presence of insoluble impurities. The sulphonation mass is then diluted with water to about 100 parts by weight and neutralized with sodium or potassium hydroxide or their equivalents. The neutral solution of sulphonates is filtered and evaporated to dryness.

The final product is a mixture of sodium (or potassium, etc.) salts of alkyl phenol sulphonic acids which in the free state correspond with the general formula:

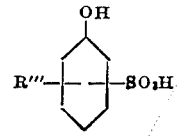

in which R''' is a primary, secondary or tertiary alkyl group, the alkyl groups having a probable average content of about 13 carbon atoms. The alkyl group is probably para-, and the sulphonic acid is probably ortho-, to the hydroxyl group.

Example 25

25 parts of an alkyl phenol mixture obtained in accordance with the procedure described in Example 1, Part 2, and boiling from 175° to 220° at 4 mm. pressure, are added to 85 parts of carbon tetrachloride. To the resulting solution, which is well agitated, 31 parts of 100 per cent. sulphuric acid are slowly added. After the addition of the acid is complete, agitation is continued for an additional period of about 20 minutes while warming the mixture to a temperature of 70° to 73°. The resulting reaction mass is drowned in 400 parts of water and made slightly alkaline to Brom Cresol Green paper with sodium hydroxide. The neutralized mass is a homogeneous emulsion. If desired, it can be dried without previous separation of the organic solvent. Some times the solvent may be removed from the reaction mass by rendering the solution alkaline, whereby the emulsion is broken and stratification occurs. The resulting product is a mixture of sodium salts of sulphonated alkyl phenols similar to the product of Example 22.

*Example 26—Sulphonated alkyl cresol mixture*

100 parts of the mixture of alkylated cresols as prepared in Example 9 are agitated rapidly while 128 parts of sulphuric acid monohydrate (100 per cent sulphuric acid) are added with temperature of the sulphonation mixture controlled to remain around 30° throughout the addition. The sulphonation mass is then warmed to 75° and held there until a sample is completely soluble in water and/or does not precipitate calcium salts (about 30 minutes). The sulphonation mass is then diluted, neutralized with caustic soda, filtered and evaporated to dryness. The resulting product is a mixture of alkyl cresol sulphonates wherein the alkyl group has a probable average content of 12 to 15 carbon atoms.

*Example 27—Sulphonated alkyl chlorophenol mixture*

The mixture of alkylated o-chlorophenols obtained in Example 13 is sulphonated and isolated in the manner described in Example 22 or Example 26. The resulting product comprises a mixture of alkyl chlorophenol sulphonates in which the alkyl group has a probable average content of 12 to 15 carbon atoms. It possesses properties similar to other alkyl phenol sulphonates herein described.

*Example 28*

10 parts of the mixture of alkyl hydroxy-quinolines prepared according to Example 16 is treated with 60 parts of sulphuric acid monohydrate at 50° for 15 to 20 minutes, the reaction mass drowned in 300 parts of cold water, the solution is made neutral to Brom Cresol Green paper by addition thereto of caustic soda, and evaporated to dryness. The resulting product comprises a mixture of the sodium salt of the alkyl hydroxy-quinoline sulphonic acids. It may be purified by extraction with alcohol, filtering, and evaporating the alcoholic solution to dryness. The product has detergent and insecticidal properties.

*Example 29*

To 25 parts of the mixture of alkyl p-hydroxydiphenyls prepared in Example 17, there is slowly added 27 parts of sulphuric acid monohydrate. The mixture is agitated at 75° for about 25 minutes, cooled, poured into water, the aqueous solution made neutral to Brom Cresol Green paper by addition of caustic soda thereto, and then evaporated to dryness. The resulting product comprises a mixture of the sodium salts of alkyl p-hydroxydiphenyl sulphonic acids in which the probable average content of the alkyl groups is about 13 carbon atoms.

*Example 30*

25 parts of the mixture of alkyl beta-naphthols prepared as described in Example 20 is heated with 33 parts of sulphuric acid monohydrate at 95° for 2 hours, the resulting mass is drowned in 300 parts of water, and the solution is made neutral to Brom Cresol Green paper by addition thereto of caustic soda. The neutralized solution is dried on a double drum drier. The resulting product comprises a mixture of alkyl beta-naphthol sulphonic acids in the form of the sodium salts. It is soluble in water, and has the properties of a detergent and dispersing agent.

The mixtures of sulphonates as obtained in Examples 22 to 30, inclusive, are light brown to white, friable solids. They are very soluble in water producing solutions which foam readily. They precipitate gelatine and glue from their aqueous solutions under tanning conditions. They do not precipitate calcium salts from hard water, although a slight turbidity may be present. They have detergent properties, and in general are excellent wetting and dispersing agents. The sulphonated alkyl phenols having an alkyl group containing from 12 to 23 carbon atoms have detersive properties which render them markedly superior, in this respect, to the previously known alkyl benzene, or alkyl naphthalene sulphonic acids. Further, they have excellent solubility in water and in most organic solvents, and in this respect, are superior to the alkyl sulphates derived from the higher alcohols such as, for example, the alcohols obtained by the hydrogenation of the fatty acids in cocoanut oil. While crude alkyl phenol mixtures, such as prepared in Example 2 or 3, may be sulphonated either before or after the separation of phenol and/or hydrocarbon from the mixture, the use of purified alkyl phenols is preferred.

*Example 31*

The mixture of alkyl phenol sulphonates produced by the process of Example 24 is extracted with several portions of alcohol in which the sulphonates are soluble. The extracts are combined, mixed with a small amount of animal charcoal to decolorize, filtered and evaporated to dryness. The resulting product is a mixture of alkyl phenol sodium sulphonates (purified kerosene phenol sulphonate) containing less than 4 per cent, and usually less than 1 per cent, of salts of inorganic acids.

*Example 32*

250 parts of the residue remaining after distilling off the fraction which boils below 145° at 20 mm. pressure from the crude oily product of Example 5, which residue contains about 25 percent. hydrocarbon, about 55 per cent. of alkyl phenol, and 20 per cent. of higher boiling products, are partially sulphonated with 36 parts of chlorsulphonic acid at 30° to 60° for about 30 minutes, and the resulting mass is neutralized by addition of 27 parts of caustic soda solution, 50 per cent. strength, thereto. The resulting product is of especial value in preparing an insecticide.

It will be realized by those skilled in the art that changes may be made in the products, and in the processes of preparing them, hereinbefore described, without departing from the scope of the invention.

Thus, the mixed sulphonated aromatic compounds of the said type AHRS may be prepared in various ways from various fractions of petroleum distillates including straight-run products and those resulting from cracking processes. The more important sources of raw material for preparation of the alkyl hydroxy aromatic compounds employed as intermediate products for the production of the sulphonated products are the kerosene fractions derived from paraffinic and/or asphaltic petroleums; as for example, those obtained from Pennsylvania, Texas, or Oklahoma petroleums, those obtained from Pennsylvania petroleum being especially preferred. Those hydrocarbon fractions of petroleum distillate which contain as low as 7 carbon atoms yield sulphonated products having high wetting power and those having from about 23 to 35 carbon atoms yield sulphonated products having valuable dispersing properties. For general use as detergents, products are preferred which are derived from petroleum distillates consisting predominantly of aliphatic hydrocarbons having a carbon content of 12 or more carbon atoms, and particularly 12 to 23 carbon atoms, and boiling for the most part between about 215° C. at atmospheric pressure and about 260° C. at 50 mm.

As will be evident from the foregoing examples, the invention includes products prepared from various fractions of petroleum distillates and boiling over a wide or narrow range of temperatures. For general use the products are prepared from kerosene fractions of wide boiling range. For individual purposes, preferred products are obtained by employing as initial material a kerosene fraction of a narrow boiling point range. Thus, for control of desired detergent properties, fractions of petroleum distillate of small boiling range, as for example a range of 5° to 20° C. may be employed and the mixtures of alkyl hydroxy aromatic compounds derived from different fractions may be blended before sulphonation or the sulphonated alkyl hydroxy aromatic compounds derived from different fractions may be blended. The use of fractions of petroleum distillates of relatively small boiling range has the advantage of facilitating the separation by distillation of the free phenol, free hydrocarbon and alkyl phenol from each other, or of the halogenated hydrocarbons from residual unhalogenated hydrocarbons.

The chlorination of the petroleum hydrocarbon may be carried out by any well known process. The approximate extent of chlorination may be determined by the increase in the weight of the hydrocarbon material chlorinated, or by the increase in the specific gravity of the mixture. Various chlorination temperatures may be employed; for example temperatures within the range 0° to 70° C., and preferably in the neighborhood of 50° C. If desired, or necessary, the chlorination may be carried out with the aid of chlorine carriers, catalysts or adjuvants, as for example, phosphorus trichloride, iodine, sunlight, etc. The following example in which the parts are by weight and the temperatures are in degrees Centigrade illustrates a procedure in which iodine is employed as a chlorine carrier.

Example 33

*Part 1.*—Chlorine is passed into a kerosene (a purified Pennsylvania petroleum distillate) boiling from 245° to 315°, and of which 90 per cent. distills between 260° and 305°, and having a specific gravity of 0.815, contained in a closed, lead-lined vessel which is equipped with a vent for hydrogen chloride produced by the chlorination. The chlorination is carried out in the dark, but to facilitate the chlorination the kerosene initially contains about 0.45 parts of iodine per 1000 parts of kerosene. The temperature of the reaction mass is preferably maintained at about 45° to 50°. The introduction of chlorine is continued until the weight of the mass increases to an extent corresponding substantially with 115 per cent. of the theoretical amount for the formation of monochloride. The specific gravity of the reaction mixture reaches about 0.915.

*Part 2.*—560 parts of the resulting mixture of chlorinated hydrocarbons, 350 parts of phenol and 28 parts of granular anhydrous zinc chloride are agitated at room temperature for about 3 hours and then heated, with agitation, at about 135° for about 5 hours. The resulting reaction mass is cooled and added to about 600 parts of water, the mixture is heated to 70° with agitation, allowed to settle, and the upper, oil layer is separated and washed with hot water to remove zinc chloride and residual phenol. The washed oil is then treated with a small amount of alkali (7 parts of a 50 per cent. solution of sodium hydroxide) and distilled in vacuo (e. g., 4 mm. pressure) in a still equipped with a fractionating column. Fractions boiling between about 140° and 230° at 4 mm. pressure are collected as separate products or as one product.

*Part 3.*—262 parts of one of the resulting mixtures of alkyl phenols (the resulting product or one of the fractions thereof) are sulphonated by agitating well with 262 parts of 100 per cent. sulphuric acid, while maintaining the temperature at 20° to 30°. When the sulphonation has been effected, the reaction mass is drowned in 1500 parts of water, treated with sufficient caustic soda to render it neutral to Delta paper (about 260 parts of a 50 per cent. solution of caustic soda), and evaporated to dryness.

If desired, the crude non-fractionated product which boils above 140° may be sulphonated instead of the fractionated product or products. The resulting sulphonated product is generally somewhat darker in color.

In general, the extent of chlorination of the petroleum hydrocarbon may be regulated by a weight increase corresponding to a product containing a ratio of about 0.25 to 2.5 atoms of chlorine per molecule of hydrocarbon, about 1.1 to 1.5 atoms being preferred, but it will be understood that other ratios may be used. Ordinarily, the greater the amount or extent of chlorination, the greater is the amount of high boiling residues obtained. In general, the monochloride boils about 15° to 20° C. higher than the petroleum distillate from which it is derived. If desired, the chlorinated products may be fractionally distilled so as to obtain a further selection and restriction of alkyl compounds having a selected content of chlorine atoms. Instead of chlorine, other halogens may be employed, e. g., bromine, etc., in effecting halogenation.

The condensation of the halogenated hydrocarbon with the hydroxy aromatic compound may be carried out with the aid of other condensing agents than zinc chloride (anhydrous); as for example, metals (such as, zinc or iron), other metal halides (such as, anhydrous aluminum chloride, anhydrous ferric chloride), dehydrating acids (such as, concentrated sulphuric acid), etc. Thus, sulphuric acid, oleum, or chlorsulphonic acid may be employed as the condensing agent when the hydroxy aromatic compound contains an acid group as a nuclear substituent (for example, one or more sulphonic acid groups or their equivalents, such as their metal salts, amides, etc.). In general, however, anhydrous zinc chloride is the preferable condensing agent since, on the whole, it gives a more uniform product and better yields.

The proportion of mixed alkyl halides with respect to the hydroxy aromatic compound employed in the preparation of the alkylated hydroxy aromatic compounds may be varied. Preferably the proportion of mixed halogenated hydrocarbons employed with respect to the hydroxy aromatic compound is such that not more than two of the long chain alkyl radicals of the type represented by R in the foregoing formula are contained in the resulting alkyl hydroxy aromatic compounds, and preferably only one. Thus, at least 1.75 mols of hydroxy aromatic compound per mol of mixed halogenated hydrocarbons is preferably employed in the condensation. A ratio as low as 1 to 1 may be employed, but the yield of the resulting alkyl hydroxy aromatic compounds containing one long alkyl group will be less. Further, the amount of condensing agent employed may vary over a wide range. For example, in using anhydrous zinc chloride as the condensing agent, in some cases as little as 1 per cent., and in others about 5 to 10 per cent. or more by weight of anhydrous zinc chloride, based upon the amount of halogenated petroleum hydrocarbon, may be employed. The condensation reaction may be carried out at any suitable temperature. However, when zinc chloride or an equivalent condensing agent is employed, temperatures between 60° C. and 140° C. are ordinarily preferred.

The duration of the condensation treatment may also be varied, the particular period of condensation being dependent to some extent upon the condensation temperature employed as well as the particular condensing agent used and nature of the desired product. The condensation is ordinarily complete in about 1 hour at refluxing temperature (approximately 180° C.), or in about 3 to 6 hours at about 135° C., when employing a metal halide condensing agent. With anhydrous zinc chloride as the condensing agent, the period of heating may be extended to 16 hours or more without seriously harming the quality or decreasing the yield of alkyl hydroxy aromatic compounds.

The mixtures of alkyl hydroxy aromatic compounds may also be prepared in other ways. Thus, the mixed alkyl halides, resulting from halogenation of the selected fraction of petroleum distillate, may be reacted with an alkali metal phenolate or other metal compound of the hydroxy aromatic compound desired to be alkylated, to form a mixture of alkyl ethers of said hydroxy aromatic compound, and the resulting ether mixture may be subjected to a rearranging treatment according to known processes to convert the said ethers to the corresponding alkyl hydroxy aromatic compounds.

Mixtures of hydroxy aromatic compounds of the said type AH may be employed as reacting ingredients, if desired; as for example, naturally occurring mixtures such as commercial cresylic acid, or artificially prepared mixtures of two or more of said hydroxy aromatic compounds.

The alkyl hydroxy aromatic compounds may be purified by fractional or steam distillation, or by other suitable processes. Purification is not essential, but it is to be noted, by the employment of mixtures of alkylated hydroxy aromatic compounds which have been purified by fractional vacuum distillation, products having superior detergent properties are obtained as compared to those produced when a relatively less pure mixture of alkyl hydroxy aromatic compounds is sulphonated.

The sulphonation of the mixture of alkylated hydroxy aromatic compounds may be carried out with any suitable agent, as for example, sulphuric acids of various strengths (66° Bé., 100%, 26% oleum, 65% oleum, etc.), chlorsulphonic acid, etc. As appears from the foregoing examples, the sulphonation may be carried out in the presence of inert solvents or diluents, as for example, the halogenated aliphatic or aromatic hydrocarbons (carbon tetrachloride, tetrachlorethane, ethylene dichloride, dichlorbenzene, etc.), or sulphonation may be carried out in their absence. When an inert solvent or diluent is used, it may be separated mechanically or by evaporation from the alkaline aqueous solution of the sulphonic acid salts of the alkyl hydroxy aromatic compounds which results upon diluting the sulphonation mass with water and adding an alkali. If desired, sulphonation assistants may be employed; as for example, the lower fatty acids and their anhydrides (e. g., acetic acid, acetic anhydride, etc.), or the alkali metal sulphates (e. g., sodium or potassium sulphate, etc.). The temperature at which the sulphonation is carried out may vary within wide limits. For example, temperatures as low as about 0° C. and as high as about 140° C. may be employed. In general, the more vigorous the sulphonation agent the lower is the preferred temperature. Preferred sulphonation temperatures lie between about 15° C. and about 90° C. Ordinarily the completion of the sulphonation is carried out at a temperature of about 35° to 80° C. In using sulphuric acid monohydrate as the sulphonating agent, a temperature of about 30° to 70° C. is preferred.

The ratio of sulphonating agent employed with respect to the mixture of alkyl hydroxy aromatic compounds also may be varied. Thus, for complete sulphonation, the sulphonating agent in terms of 100% sulphuric acid may range from about 0.3 to 5 times or more the weight of the alkyl hydroxy aromatic compounds to be sulphonated. The extent to which the sulphonation is carried out may vary with the particular material being sulphonated, the duration or time of sulphonation, and the use to be made of the sulphonated product. In some cases, a degree of sulphonation which corresponds with a product having maximum detergent properties is not completely soluble in water to form a clear solution and/or may cause some precipitation of lime salts. On the other hand, a product which causes no precipitation of lime salts may not have maximum obtainable detergent properties because of excessive sulphonation. Furthermore, in some cases the degree of sulphonation may not be the same for products to be used in soft water, in hard water and in alkaline solutions. (As a standard of comparison, an aqueous solution of calcium chloride equivalent to 0.224 grams calcium oxide per liter of solution is employed as a standard hard water.) For use of the products as detergents, a degree of sulphonation corresponding with maximum detergent action (approximately monosulphonation) is preferred.

The sulphonated products may be employed in the form of their free sulphonic acids or in the form of salts. They are preferably employed in the form of salts of the alkali metals. The salts may be obtained in any suitable manner; for example, by reacting the sulphonated product with a metal oxide or hydroxide, ammonia or an organic base, or of a suitable salt of one of these, in an amount adapted to form a neutral product. Among the bases, oxides and salts which may be combined with the sulphonated products to produce salts useful as detergents in accordance with the present invention, are, for example, sodium, potassium and ammonium hydroxides; sodium, potassium and ammonium carbonates and bicarbonates; ammonia; magnesium oxide; ethylamine; pyridine; triethanolamine; propanolamines; butanolamines; diamino propanol; ethylene diamine; triethylene tetramine; aniline; o-toluidine; etc.

The reaction mixtures resulting from the sulphonation of the mixed alkyl hydroxy aromatic compounds may also be directly employed for the formation of mixed products, as for example, mixtures of salts of the alkyl hydroxy aromatic sulphonic acids and other acids present in said reaction mixtures, which mixtures of salts are also useful as detergents in accordance with the present invention. Thus, the sulphonation reaction mixture resulting from the treatment of the mixed alkyl hydroxy aromatic compounds with an amount of sulphonating agent in excess of that theoretically required to effect the desired degree of sulphonation may be treated with a suitable inorganic or organic base or basic salt (as for example, one of those mentioned) and the resulting mixture of the salt of the sulphonated alkyl hydroxy aromatic compounds and the inorganic salt (as for example, sodium sulphate) may be jointly isolated from the reaction mixture and employed as such as a detergent. If it is desired to produce salts of the sulphonated alkyl hydroxy aromatic compounds in a form substantially free from inorganic salts (for example, inorganic sulphates) this may be accomplished either by taking advantage of their greater solubility than the inorganic salts in alcohol and other organic solvents, or by using an amount of chlorsulphonic acid such that no excess, or only a relatively small excess, of same is present in the final sulphonation mass or mixture.

The sulphonated products in the form of metallic salts or salts of inorganic bases are usually yellowish to white, friable solids; and in the form of salts of organic bases vary from viscous oils to semi-solids to solids. In general, the salts are readily soluble in water and in neutral, acid or alkaline aqueous solutions to form solutions which are colorless, or faintly colored brown or yellow, which are of a soapy nature, and foam readily. Certain of the salts, such as the impure salts of organic polyamines, are oils which generally are insoluble in water but soluble in organic solvents (as for example, alcohol, benzene, gasoline, etc.), in which they exert detergent action, and in aqueous solutions of alkalis (presumably by conversion to the salts of the alkalis).

The sulphonated products may be dried in any suitable manner; as for example, in pans in shelf, atmospheric or vacuum, driers; in vacuum pan or vacuum rotary driers; on atmospheric or vacuum drum driers; in spray driers; etc. The particular type of drier employed will obviously be selected with a view to the physical nature and chemical stability of the particular product. Preferably the sulphonates derived from organic bases are dried under vacuum conditions.

While, as has been indicated above, various mixtures of alkyl hydroxy aromatic compounds containing one or more hydroxyl groups, one or two nuclear alkyl groups derived from a hydrocarbon or petroleum distillate having a definite boiling range corresponding with aliphatic hydrocarbons having 7 or more carbon atoms in their composition, one or more sulphonic acid groups, and which may be further substituted, are included in the present invention, mixtures of those compounds which are derived from a monohydroxy phenol of the benzene series which contain only one nuclear alkyl group of the said type R derived from a petroleum distillate boiling within the range about 215° at atmospheric pressure to about 260° at 50 mm. pressure, and which are sulphonated to an extent substantially corresponding with the monosulphonic acid compounds, are of special importance.

It is to be noted that any of the said sulphonated products or their mixtures may be employed in connection with other hydrotropic substances; dispersing, emulsifying and/or penetrating agents; aliphatic or aromatic sulphonic acids; acid alkyl esters of sulphuric acid; sulphonation products of petroleum oil; alkyl aryl sulphonates free from a nuclear hydroxyl group; and/or their derivatives.

In addition to the above described uses of the sulphonated products employed as detergents in accordance with the present invention and in recapitulation of the various uses hereinbefore described for said products, it is noted that the said sulphonated products may be employed for a large variety of purposes wherein cleansing, dispersing, penetrating, wetting, tanning, surface tension lowering, insecticidal, fungicidal, germicidal and similar action is required.

Thus, the said sulphonic acids and their salts may be incorporated into compositions containing laundry and toilet soaps, water insoluble dyes, sulphurized oils, hydrocarbons, alcohols, esters, alkyl amines, mixed amines, fats, oils, waxes, unguents, alkyl phenols, ketones, mineral oils, resinous substances, alkyl sulphates, organic acids of an aromatic or aliphatic nature, inorganic bases, organic bases, inorganic salts, inorganic acids, etc.

The said sulphonates are of great value where dispersion is required, including emulsification, suspension, colloidal solution, conversion into foam (aeration), reduction of surface tension effects, as well as detergency. The said sulphonated products are of particular value in treating natural or artificial fibrous substances such as cotton, wool, flax, silk, hair, straw or any other animal or vegetable fiber, artificial silks, rayon, hides, skins, leather, paper, feathers, etc.; for example in dyeing with water-soluble or water-insoluble dyes, the presence in the dye-containing composition of alkyl hydroxy aromatic sulphonated products causes the dyestuff to be well dispersed in, and imparts great penetrating power to, the treating composition containing the dye whereby levelling, brilliancy and fastness characteristics of the shade of the dye, as well as penetration of the dye into the fiber, are enhanced.

Because of their hydrotropic nature, the said sulphonic acids and their salts are valuable ingredients of compositions in which solids and liquids which are insoluble or almost insoluble in water are desired to be held in solution or colloidal suspension or are desired to be solubilized.

The said sulphonates can be incorporated in compositions prepared and applied with a dye or mixture of dyes, as for example, acid, chrome, developing, direct, sulphur or vat dyes, or aniline black, or the so-called "ice-colors," etc. They may be used in baths or preparations of any kind which are used for dyeing, printing, padding, stencilling, stamping, developing or coloring fibrous material in any manner whatsoever. The compositions can be employed in baths or preparations containing dispersed or solubilized water-insoluble dyes and can be applied, for example, to fibrous material made of or containing artificial silk.

In the treatment of fibrous material, compositions containing these sulphonates can be applied to increase penetration of treating solutions into the fiber and such improvement in penetrating power is had regardless of the alkaline, neutral or acid nature of the solution, and is effective in all manner of processes, such as bowking, bleaching, cleaning, carbonizing, degreasing, dry-cleaning, felting, finishing, greasing, impregnating, lubricating, lathering, laundering, mercerizing, softening, stripping, scouring, sizing, washing and wetting. In acid treating baths, as for example, in wool carbonizing baths or acid-dyeing baths, the said sulphonates act as anti-acid and acid-protective agents. Their detergent properties in acid solution permit, for example, scouring of raw wool in an acid carbonizing bath.

The said sulphonates appear to react with silk and wool to protect them, as for example, against staining by cotton dyes.

The said sulphonates further have the valuable property of imparting excellent, and often unusually intensive, dispersing, emulsifying and penetrating characteristics to compositions containing them, which thereby become valuable active agents in processes for the removal of grease, wax, soap deposits, etc.; in processes for cleansing, scouring, bowking, degreasing; or in processes requiring the rapid transfer of active agents into the fiber (such as acid in carbonizing; dye or intermediate solutions and dispersions in dyeing, padding, printing, etc.; latex solution in impregnating; caustic soda in mercerizing; hypochlorite in bleaching; hydrosulphite in stripping; etc.).

Compositions containing the said sulphonates for finishing, lubricating, sizing, and soaping fibrous material are effective and rapid in action. They inhibit the deposition of insoluble soaps in baths which contain hard water and soaps, and sometimes completely prevent precipitation of lime soaps. They improve the detergency of soap in either soft or hard water solutions.

The said sulphonates may also be employed to permit more uniform precipitation of artificial silk in a precipitating bath, better washing of nitrocellulose in a steeping and washing bath, more uniform lubrication of threads by a spinning bath, and greater cleansing with a dry cleaning bath. Fibrous materials impregnated with a solution of the said sulphonates have a marked, increased imbibing or absorption power for the varied treating solutions and compositions commonly applied to such material.

The said sulphonates can be incorporated and applied in tanning compositions alone or in combination with other tanning and/or treating compositions for leather, skins, etc.

Their dispersing power makes them valuable ingredients for making aqueous compositions comprising dispersions of resins, pigments, insoluble substances such as vat dyes, colloidal sulphur, blanc-fixe, soot, minerals, etc., and in the making of pigments, inks, plastics, etc. The dispersions may be made in any desirable manner; as by adding the solid, in friable or finely divided form, to a dilute or concentrated solution of the said sulphonates; or the sulphonates may be incorporated with the solid, before addition to aqueous media; or the insoluble substance may be caused to form in the composition in the presence of the sulphonates, as for example, by mixing an organic soluble dye and an appropriate metal salt solution to form a lake pigment in an aqueous medium, or by precipitating a basic dye or dyes from an aqueous solution, by means of the sulphonates in the solutions.

The said sulphonates are valuable ingredients in electrolytic baths inducing by their presence more uniform depositions from electrolytes.

The said sulphonates are also valuable as insecticides, fungicides and germicides, alone or in combination with other substances.

The said sulphonates are also valuable stabilizing agents for diazonium, and nitroso preparations, and prevent their rapid decomposition. They combine readily with diazo preparations of this type to precipitate stable compounds capable of being dried and handled without fear of rapid decomposition. They are accordingly valuable ingredients in compositions containing diazonium or nitroso preparations applied to fibrous materials by dyeing, printing, padding and generally related processes.

The said sulphonates possess the valuable property of dispersing gases in liquids, thereby imparting to their solutions strong foaming and frothing qualities. They are valuable components of compositions and processes requiring frothing or foaming, as for example, in dyeing textile materials by foam methods; in protecting oxidizable baths (e. g., reduced dye baths) against oxidation by air; in the separation of minerals by flotation; in aerating liquids and washing gases; and in fire extinguishing preparations.

The emulsifying, dispersing and wetting power imparted to compositions containing the said sulphonates makes them valuable components of cosmetic preparations such as hair washes, dentifrices, cleansers, toilet soaps, mouth washes; as well as of germicides, insecticides, fungicides, parasiticides, etc., in which preparations they cause emulsification and uniform dispersion of active ingredients, and impart strong penetrating and wetting properties which insure intimate contact with surfaces to which the preparations are applied. For the same reasons, they are valuable ingredients of oils applied as boring oils; and of lubricants, etc., for products such as leather, or for spinning processes, or for machinery; and of aerated liquids or compositions for holding and washing gases.

They are valuable components of compositions and processes applied to the production of sterile products such as sterile starch, glue, wood, gelatine, etc.

The dispersive and detergent properties imparted to compositions containing the said sulphonates also make them highly valuable ingredients and/or substitutes for soap, as in soap dye preparations of all kinds.

In all cases where desired, they may be incorporated in compositions containing protective colloids, such as glue, gum arabic and/or gelatine when used under conditions which do not cause precipitation thereof.

The said sulphonates also possess the property of altering ultra-violet light in the direction of the visible spectrum. Accordingly, they can be incorporated in compositions, particularly in organic solvents in which they are soluble, to be applied for the purpose of preventing sunburn, or other objectionable action of ultra-violet light. They may be applied to convert ultra-violet light to visible light, and thus serve as dyes or pigments for substances to be viewed under ultraviolet light.

The free sulphonic acids are effective and valuable fat-saponifying agents.

The said sulphonates may also be employed as intermediates for the preparation of other chemical compounds. Inasmuch as they contain a phenolic hydroxyl group they may be employed as coupling components for azo dyes.

Compositions containing these sulphonates in solution are not confined to such as are made with and contain water as the essential liquid medium. Water is preferred, but may be replaced by alcohol or other solvent as required or found desirable and in which the sulphonates are soluble.

Solutions in organic solvents of the organic amine salts, whether water-soluble or insoluble, of said sulphonic acids are particularly suitable as such or in admixture with other substances for use in dry-cleaning of fibres, fabrics and other material.

In addition to their use as intermediates for the production of sulphonated products, the mixed alkyl hydroxy aromatic compounds of the said type AHR may be employed as detergents in the form of solutions in alcohol-water mixtures containing caustic alkali; as insecticides, germicides, parasiticides, or vermicides; as wetting agents in conjunction with emulsifying agents; as assistants in emulsification; as solvents; as intermediates for the production of resins of all kinds in which phenols are reacted with resin-forming ingredients of various types; as plasticizers for resinous products, cellulose plastics, and other synthetic and natural plastics of all types; as intermediates for the production of azo dyestuffs useful for the dyeing of cellulose esters and ethers, and/or soluble in organic solvents; etc.

I claim:

1. A mixture of sulphonated alkyl hydroxy aromatic compounds of the type AHRS which mixture is obtainable by the halogenation of a petroleum distillate to form mixed alkyl halides, conversion of a hydroxy aromatic compound of the type AH to a mixture of alkyl hydroxy aromatic compounds of the type AHR by a process including reaction thereof with resulting mixed alkyl halides, and sulphonation of a resulting mixture of alkyl hydroxy aromatic compounds; A representing an aromatic nucleus, H representing a nuclear hydroxyl group, R representing a nuclear alkyl group containing at least 7 carbon atoms, and S representing a member of the group consisting of the sulphonic acid group and salts thereof.

2. A mixture of sulphonated alkyl hydroxy aromatic compounds of the type AHRS obtainable by the halogenation of a petroleum distillate to form a mixture of alkyl halides, conversion of a hydroxy aromatic compound of the type AH to a mixture of alkyl hydroxy aromatic compounds of the type AHR by a process including reaction thereof with resulting mixed alkyl halides, and sulphonation of a resulting mixture of alkyl hydroxy-aromatic compounds; A representing an aromatic nucleus, H representing a nuclear hydroxyl group, R representing a nuclear alkyl group containing 12 to 23 carbon atoms, and S representing a member of the group consisting of the sulphonic acid group and salts thereof.

3. A sulphonation product of the group consisting of the free sulphonic acids and salts thereof obtainable by the halogenation of a petroleum distillate whose boiling point lies within the range 80° C. at atmospheric pressure to 380° C. at 50 mm. pressure, condensation of at least a portion of the resulting halogenated product with a hydroxy aromatic compound, and sulphonation of at least a portion of the resulting condensation product.

4. A mixture of sulphonated aromatic compounds of the type AHRS which mixture is obtainable by chlorinating a kerosene fraction of petroleum distillate, condensing the resulting mixture of chlorhydrocarbons with a phenol to produce a mixture of nuclear alkyl phenol compounds, and sulphonating the resulting mixture of nuclear alkyl phenol compounds; A representing a radical of the benzene series, H representing a nuclear hydroxyl group, R representing a nuclear alkyl group containing 12 to 23 carbon atoms, and S representing a member of the group consisting of a nuclear sulphonic acid group and salts thereof.

5. A mixture of sulphonated aromatic compounds of the type AHRS (A representing an aromatic nucleus, H representing a nuclear hydroxyl group, R representing a nuclear alkyl group containing at least 7 carbon atoms and derivable by chlorination of a kerosene fraction of petroleum, and S representing a member of the group consisting of a nuclear sulphonic acid group and salts thereof), said mixture containing a plurality of related sulphonated aromatic compounds of the type AHRS which differ from each other in the alkyl group represented by R.

6. A mixture of sulphonated alkyl phenols that contain a single nuclear alkyl group containing at least 7 carbon atoms and derivable by chlorination of petroleum hydrocarbons and condensation of a mixture of resulting alkyl chlorides with a phenol of the benzene series followed by sulphonation.

7. A mixture of monoalkyl phenol sulphonates that differ from each other in the alkyl groups, which alkyl groups correspond with the aliphatic hydrocarbons of a petroleum distillate boiling for the most part between 215° C. at atmospheric pressure and 260° C. at 50 mm. pressure.

8. A mixture of sulphonated alkyl derivatives of phenol of the type

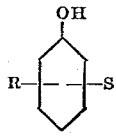

(R representing an alkyl hydrocarbon group containing 12 to 23 carbon atoms and derivable by chlorination of a kerosene fraction of petroleum distillate, and S representing a member of the group consisting of a nuclear sulphonic acid group and salts thereof), said mixture containing a plurality of related sulphonated alkyl phenols of said type which differ from each other in the alkyl hydrocarbon group represented by R.

9. A mixture of sulphonated alkyl phenols that contain a single nuclear alkyl group containing 14 to 19 carbon atoms and derivable by chlorination of petroleum hydrocarbons and condensation of a mixture of resulting alkyl chlorides with a phenol of the benzene series followed by sulphonation.

10. A method of making a sulphonated product useful as a detergent, wetting agent and emulsifying agent, which comprises halogenating a petroleum distillate containing mainly hydrocarbons having at least 7 carbon atoms per molecule to form mixed alkyl halides, converting a hydroxy aromatic compound of the type AH to a mixture of alkyl hydroxy aromatic compounds of the type AHR by a process including reaction of the hydroxy aromatic compound with mixed alkyl halides resulting from the halogenation, and sulphonating a resulting mixture of alkyl hydroxy aromatic compounds of the type AHR; A representing an aromatic nucleus, H representing a nuclear hydroxyl group, and R representing an alkyl group containing at least 7 carbon atoms.

11. A method of making a sulphonated product useful as a detergent, wetting agent and emulsifying agent, which comprises chlorinating a petroleum distillate containing mainly hydrocarbons having 7 to 35 carbon atoms per molecule to form mixed alkyl chlorides, condensing resulting mixed alkyl chlorides with a phenol of the benzene and naphthalene series to form a mixture of alkyl hydroxy aromatic compounds of the type AHR, and sulphonating a mixture of said alkyl hydroxy aromatic compounds; A representing an aromatic nucleus of the benzene and naphthalene series, H representing a nuclear hydroxyl group, and R representing a nuclear alkyl group containing 7 to 35 carbon atoms.

12. A method of making a sulphonated product useful as a detergent, wetting agent and emulsifying agent, which comprises chlorinating a petroleum distillate whose boiling point lies within the range about 80° C. at atmospheric pressure to about 380° C. at 50 mm. pressure, condensing a mixture of alkyl chlorides resulting from the chlorination with a hydroxy aromatic compound of the type AH with the aid of a metal halide condensing agent to form a mixture of alkyl hydroxy aromatic compounds of the type AHR, and sulphonating a mixture of alkyl hydroxy aromatic compounds resulting from the condensation; A representing an aromatic nucleus, H representing a nuclear hydroxyl group, and R representing a nuclear alkyl group.

13. A method of making a sulphonated product useful as a detergent, wetting agent and emulsifying agent, which comprises chlorinating a petroleum distillate which for the most part boils between about 215° C. at atmospheric pressure and about 260° C. at 50 mm. pressure, condensing a mixture of alkyl chlorides resulting from the chlorination with a phenol of the benzene series to form a mixture of alkyl hydroxy aromatic compounds of the formula AHR, and sulphonating a mixture of alkyl hydroxy aromatic compounds resulting from the condensation; A representing a hydrocarbon nucleus of the benzene series, H representing a nuclear hydroxyl group, and R representing a nuclear alkyl group.

14. A method of making a sulphonated product useful as a detergent, wetting agent and emulsifying agent, which comprises chlorinating kerosene, condensing the resulting mixture of alkyl chlorides with a phenol of the benzene series with the aid of a metal halide condensing agent, and sulphonating the resulting mixture of alkyl phenols.

15. A method of making a sulphonated product useful as a detergent, wetting agent and emulsifying agent, which comprises sulphonating a mixture of alkyl hydroxy aromatic compounds of the type AHR, wherein the alkyl groups represented by R are derived from petroleum distillates, with a sulphonating agent in an amount in excess of that required for monosulphonation, converting the resulting reaction mixture to a mixture of salts of sulphonated alkyl hydroxy aromatic compounds of the type AHR and sulphate salt, and jointly recovering the resulting salts; A representing an aromatic nucleus, H representing a nuclear hydroxyl group, and R representing a nuclear alkyl group containing at least 7 carbon atoms.

16. A method of making a sulphonated product useful as a detergent, wetting agent and emulsifying agent, which comprises sulphonating a mixture of alkyl phenols of the type AHR, wherein the alkyl groups represented by R are derived from petroleum distillates, with a sulphonating agent in an amount in excess of that required for monosulphonation, converting the resulting reaction mixture to a mixture of alkali-metal salts of sulphonated alkyl phenols of the type AHR and alkali-metal sulphate, and jointly recovering the resulting salts and sulphate; AH representing a phenol of the benzene series, and R representing an alkyl group containing 12 to 23 carbon atoms.

17. A method of making a sulphonated product useful as a detergent, wetting agent and emulsifying agent, which comprises chlorinating with the aid of light a petroleum distillate containing mainly hydrocarbons having at least 7 carbon atoms per molecule to form mixed alkyl chlorides, converting a hydroxy aromatic compound of the type AH to a mixture of alkyl hydroxy aromatic compounds of the type AHR by a process including reaction of the hydroxy aromatic compound with mixed alkyl halides resulting from the halogenation, and sulphonating the resulting mixture of alkyl hydroxy aromatic compounds of the type AHR; A representing an aromatic nucleus, H representing a nuclear hydroxyl group, and R representing an alkyl group containing at least 7 carbon atoms.

18. A method of making a sulphonated product useful as a detergent, wetting agent and emulsifying agent, which comprises chlorinating with the aid of light a petroleum distillate which for the most part boils between about 215° C. at atmospheric pressure and 260° C. at 50 mm. pressure to form mixed alkyl chlorides, condensing a mixture of alkyl chlorides resulting from the chlorination with a hydroxy aromatic compound of the type AH with the aid of a metal halide condensing agent to form a mixture of alkyl hydroxy aromatic compounds of the type AHR, and sulphonating a mixture of alkyl hydroxy aromatic compounds resulting from the condensation; A representing an aromatic nucleus, H representing a nuclear hydroxyl group, and R representing a nuclear alkyl group.

19. A method of making a sulphonated product useful as a detergent, wetting agent and emulsiyfing agent, which comprises chlorinating a petroleum distillate containing mainly hydrocarbons having at least 7 carbon atoms per molecule to form mixed alkyl chlorides, converting a hydroxy aromatic compound of the type AH to a mixture of alkyl hydroxy aromatic compounds of the type AHR by a process including reaction of the hydroxy aromatic compound with mixed alkyl halides resulting from the halogenation, and sulphonating the resulting mixture of alkyl hydroxy aromatic compounds of the type AHR with sulphuric acid of about 100 per cent strength; A representing an aromatic nucleus, H representing a nuclear hydroxyl group, and R representing an alkyl group containing at least 7 carbon atoms.

20. A method of making a sulphonated product useful as a detergent, wetting agent and emulsifying agent, which comprises chlorinating a petroleum distillate which for the most part boils over a range within the limits of 195° to 300° C. at atmospheric pressure to form mixed alkyl chlorides, condensing a mixture of alkyl chlorides resulting from the chlorination with a hydroxy aromatic compound of the type AH to form a mixture of alkyl hydroxy aromatic compounds of the type AHR, and sulphonating a mixture of alkyl hydroxy aromatic compounds resulting from the condensation; A representing an aromatic nucleus, H representing a nuclear hydroxyl group, and R representing a nuclear alkyl group.

LAWRENCE H. FLETT.